United States Patent
Sureshchandra et al.

(10) Patent No.: US 9,031,996 B2
(45) Date of Patent: May 12, 2015

(54) SYSTEM, METHOD AND COMPUTER PROGRAM PRODUCT FOR CREATING A PLURALITY OF CNAMES FOR A WEBSITE

(75) Inventors: Jayesh Sureshchandra, San Francisco, CA (US); Ryan Guest, Stockton, CA (US)

(73) Assignee: salesforce.com, San Francisco, CA (US)

( * ) Notice: Subject to any disclaimer, the term of this patent is extended or adjusted under 35 U.S.C. 154(b) by 466 days.

(21) Appl. No.: 12/982,708

(22) Filed: Dec. 30, 2010

(65) Prior Publication Data

US 2011/0225206 A1 Sep. 15, 2011

Related U.S. Application Data

(60) Provisional application No. 61/314,001, filed on Mar. 15, 2010.

(51) Int. Cl.
G06F 17/30 (2006.01)
G06F 7/00 (2006.01)
H04L 29/12 (2006.01)

(52) U.S. Cl.
CPC ...... *H04L 61/1511* (2013.01); *H04L 29/12066* (2013.01)

(58) Field of Classification Search
CPC .......... G06F 17/3089; G06F 17/30902; G06F 17/30876; G06F 17/30887
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |

(Continued)

OTHER PUBLICATIONS

U.S. Appl. No. 60/828,192, filed Oct. 4, 2006.

(Continued)

*Primary Examiner* — Dung K Chau (74) *Attorney, Agent, or Firm* — Zilka-Kotab, PC (57) ABSTRACT

In accordance with embodiments, there are provided mechanisms and methods for creating a plurality of cnames for a website. These mechanisms and methods for creating a plurality of cnames for a website can provide multiple DNS entries for a single website. The ability to provide multiple DNS entries for a single website can enable websites to be accessible from multiple locations.

20 Claims, 5 Drawing Sheets

(56) References Cited

U.S. PATENT DOCUMENTS

| | | | |
|---|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| RE41,024 E * | 12/2009 | Alkhatib et al. ............. 370/392 |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven, Deceased et al. |
| 8,457,545 B2 | 6/2013 | Chan |
| 8,484,111 B2 | 7/2013 | Frankland et al. |
| 2001/0044791 A1 | 11/2001 | Richter et al. |
| 2001/0052016 A1 * | 12/2001 | Skene et al. ................. 709/226 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0184390 A1 * | 12/2002 | Alkhatib ...................... 709/245 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2006/0248190 A1 * | 11/2006 | Gardos et al. ................. 709/225 |
| 2007/0038994 A1 * | 2/2007 | Davis et al. ................... 717/174 |
| 2007/0288588 A1 * | 12/2007 | Wein et al. .................... 709/214 |
| 2008/0005127 A1 * | 1/2008 | Schneider ........................ 707/10 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0011120 A1 * | 1/2010 | Kommula ...................... 709/235 |
| 2010/0023693 A1 * | 1/2010 | Dilley et al. ................... 711/118 |
| 2010/0313257 A1 * | 12/2010 | Padinjareveetil ................. 726/8 |
| 2013/0218948 A1 | 8/2013 | Jakobson; Gabriel |
| 2013/0218949 A1 | 8/2013 | Jakobson; Gabriel |
| 2013/0218966 A1 | 8/2013 | Jakobson; Gabriel |

OTHER PUBLICATIONS

U.S. Appl. No. 61/324,699, filed Apr. 15, 2010.

* cited by examiner

SYSTEM, METHOD AND COMPUTER PROGRAM PRODUCT FOR CREATING A PLURALITY OF CNAMES FOR A WEBSITE

CLAIM OF PRIORITY

This application claims the benefit of U.S. Provisional Patent Application 61/314,001 entitled "Method Of Programmatically Creating And Updating CNAMES In DNS For Hosting Multiple Public Websites On A Multitenant Architecture," by Sureshchandra et al., filed Mar. 15, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to creating domain name service (DNS) entries for subdomains in a network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional network systems, domain name service (DNS) is used for communicating over a network to a particular location on the network. Specifically, a domain name registered with DNS is assigned to a particular location [e.g. interact protocol (IP) address] on the network for use by users in communicating to the particular location. Thus, when a user communicates with a website, the user directs the communication to the domain name specific to the location of the website.

However, the traditional way of using DNS to access websites has been limited in various respects. For example, a single DNS entry pointing to the location of a website has typically been generated when the website is created. Unfortunately, this does not account for when there are multiple locations from which a website may be accessed. Accordingly, it is desirable to provide techniques enabling multiple DNS entries to be generated when a website is created to improve the manner in which DNS may be utilized for accessing websites.

BRIEF SUMMARY

In accordance with embodiments, there are provided mechanisms and methods for creating a plurality of mimes for a website. These mechanisms and methods for creating a plurality of cnames for a website can enable embodiments to provide multiple DNS entries for a single website. The ability of embodiments to provide multiple DNS entries for a single website can enable websites to be accessible from multiple locations.

In an embodiment and by way of example, a method for creating a plurality of cnames for a website is provided. In use, a request to create a website in a subdomain is received. Additionally, a first cname pointing to a first location on a network, utilizing an identifier of the subdomain, is created. Further, a second cname pointing to a second location on the network, utilizing the identifier of the subdomain, is created. Still yet, access to the website via the first crime and the second cname is provided.

While one or more implementations and techniques are described with reference to an embodiment in which creating a plurality of cnames for a website is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for creating a plurality of cnames for a website.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing creating a plurality of cnames for a website will be described with reference to example embodiments.

Figure 1:
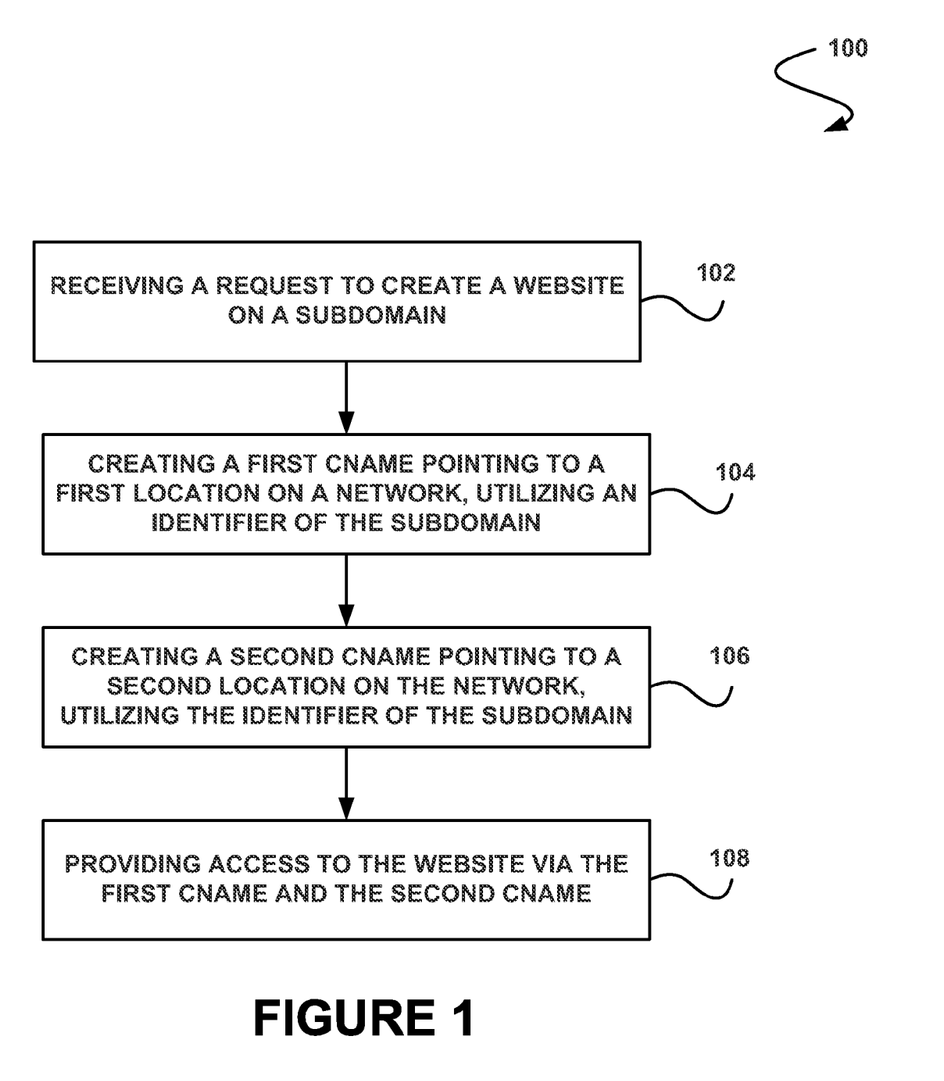
FIG. 1 illustrates a method for creating a plurality of cnames for a website, in accordance with an embodiment.

FIG. 1 illustrates a method 100 for creating a plurality of cnames for a website, in accordance with an embodiment. As shown in operation 102, a request to create a website in a subdomain is received. With respect to the present description, the subdomain includes any domain that is a subpart of a larger domain and on which a website may be located. For example, the subdomain may be registered as a subpart of the larger domain.

In one embodiment, the subdomain may be of a multi-tenant on-demand database system. Just by way of example, a tenant of the multi-tenant on-demand database system may register the subdomain for use in storing content (e.g. applications, websites, etc.). It should be noted that the subdomain may be publicly accessible, such that users may access content stored thereon from within the multi-tenant on-demand database system and from outside of the multi-tenant on-demand database system.

To this end, the website requested to be created in the subdomain may be a publicly accessible website. Furthermore, the website may include a first website to be created on the subdomain. Thus, the method 100 may optionally only be performed with respect to receipt of a request to create a first website on the subdomain (e.g. and not necessarily in response to registration of the subdomain).

Also, with respect to the present description, the request to create the website may include any request to provide access to the website via creation of a plurality of cnames, as described below. For example, the request to create the website may include a request to register with DNS. In one embodiment, the request may be to create a new website (e.g. for which cnames do not already exist). In another embodiment, the request may be to rename the website (e.g. for which cnames already exist).

Additionally, as shown in operation 104, a first cname pointing to a first location on a network, utilizing an identifier of the subdomain, is created. With respect to the present description, the cname includes an alias for another domain name. Accordingly, the first cname may include an alias for a domain name that points to the first location.

It should be noted that the first location may include any location on a network (e.g. the Internet, etc.) at which the website may be accessed. In one embodiment, the first location may be on the subdomain. Thus, where the subdomain is on the multi-tenant on-demand database system, as described above, the first location may be in the multi-tenant on-demand database system. Just by way of example, the first location may include a server on which a publisher of the website (e.g. tenant providing the website) stores the website.

As noted above, the first cname is created utilizing an identifier (e.g. name, code, etc.) of the subdomain. In one embodiment, the first cname may be created according to a predefined format including the identifier of the subdomain. In another embodiment, the first cname may be created according to a first subset of parameters included in the request, one of which may include the identifier of the subdomain.

For example, the first subset of parameters may include a domain name pointing to the first location (e.g. for which the cname is an alias), a suffix of the website, the identifier of the subdomain, and the identifier of a previous subdomain. Where the request to create the website is a request to create a new website, such that a previous subdomain for the website does not exist, the identifier of the subdomain may be used as the identifier of the previous subdomain. Table 1 illustrates one example of a format for creating a cname. Of course, it should be noted that the format shown in Table 1 is set forth for illustrative purposes only, and thus should not be construed as limiting in any manner.

TABLE 1 identifier_of_the_subdomain. suffix_of_the_website

Thus, in the context of the format of Table 1 where the first subset of parameters indicate that the identifier of the subdomain is "foo" and the suffix of the website is "secure.force.com", the cname may be created as "foo.secure.force.com," and may be an alias for the domain name pointing to the first location, as indicated by the first subset of parameters included in the request.

Further, as shown in operation 106, a second cname pointing to a second location on the network, utilizing the identifier of the subdomain, is created. With respect to the present description, the second location includes any location on the network that is different from the first location. In one embodiment, the second location may be on a domain separate from the subdomain (i.e. such that the first location and second location are on separate domains). For example, the second location may include a server on which a service (e.g. separate from the multi-tenant on-demand database system, such as the Dynamic Site Accelerator by Akamai) caches a copy of the website.

It should be noted that the second cname may be created utilizing the identifier of the subdomain in a manner similar to the first cname. For example, the second cname may be created according to a predefined format including the identifier of the subdomain, such as the format shown in Table 1. In another embodiment, the second cname may be created according to a second subset of parameters included in the request, one of which may include the identifier of the subdomain.

For example, the second subset of parameters may include a domain name pointing to the second location (e.g. for which the cname is an alias), a suffix of the website, the identifier of the subdomain, and the identifier of a previous subdomain. As noted above, where the request to create the website is a request to create a new website, such that a previous subdomain for the website does not exist, the identifier of the subdomain may be used as the identifier of the previous subdomain.

In the context of the example of Table 1, where the second subset of parameters indicate that the identifier of the subdomain is "foo" and the suffix of the website is "force.com", the cname may be created as "foo.force.com," and may be an alias for the domain name pointing to the second location, as indicated by the second subset of parameters included in the request.

To this end, the request may include the parameters for creating the first cname and the second cname. As noted above, the request may include a first subset of the parameters and a second subset of the parameters, where the first subset of the parameters is used to create the first cname and the second subset of the parameters is used to create the second cname. In one embodiment, the first subset of the parameters may be included in a first message of the request, and the second subset of the parameters may be included in a second message of the request.

Table 2 illustrates one example of the format of a message that may be included in the request for creating the website, where such format is shown as a comma separated string. Again, it should be noted that the message format shown in Table 2 is set forth for illustrative purposes only, and thus should not be construed as limiting in any manner,

TABLE 2

<host portion of what CNAME should point to>,<site suffix>, <subdomain>,<old subdomain>

In the context of the format shown in Table 2, the message "na1.force.com.edgekey.net,.force.com,foo,foo" would result in creation of the cname "foo.force.com" as an alias for "na1.force.com.edgekey.net," Further, the message "foo.na1.force.com,.secure.force.com,foo,foo" would result in creation of the cname "foo.secure.force.com" as an alias for "foo.na1.force.com,"

Still yet, as shown in operation 108, access to the website via the first cname and the second cname is provided. In the context of the present description, access to the website may include retrieving the website via browser of a user computer, viewing the website, etc. For example, providing access to the website via the first cname and the second cname may include storing the first cname and the second cname as DNS entries.

Accordingly, providing access to the website may include making the website publicly accessible. In one embodiment, secure network traffic [e.g. Hypertext Transfer Protocol Secure (HTTPS) traffic or other Secure Sockets Layer (SSL) traffic, etc.] may be provided access to the website via the first cname. In another embodiment, unsecure network traffic (e.g. Hypertext Transfer Protocol (HTTP) traffic) may be provided access to the website via the second cname.

Just by way of example, the website may contain a plurality of different web pages. At least one of the web pages may utilize secure communications, while other ones of the web pages may use unsecure communications. When creating the website, the web pages using secure communications may be configured to be accessible by the first cname, and the web pages using unsecure communications may be configured to be accessible by the second cname. In this way, the first cname and the second cname may each be utilized for accessing different portions of the website.

Figure 2:
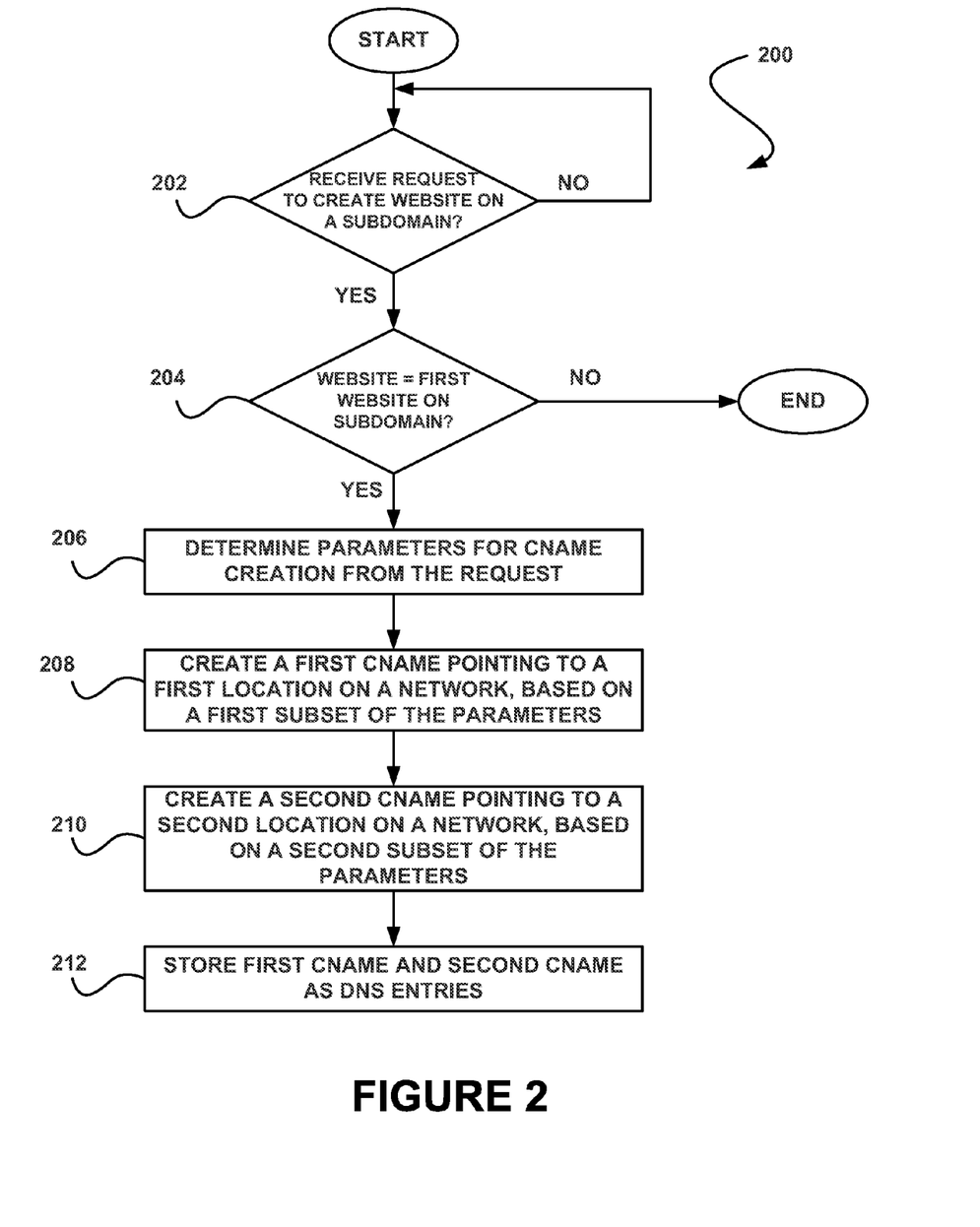
FIG. 2 illustrates a method for creating a plurality of cnames for a newly created website, in accordance with an embodiment.

FIG. 2 illustrates a method 200 for creating a plurality of cnames for a newly created website, in accordance with an embodiment. As an option, the present method 200 may be carried out in the context of the functionality of FIG. 1. Of course, however, the method 200 may be carried out in any desired environment. The aforementioned definitions may apply during the present description.

As shown in decision 202, it is determined whether a request to create a website on a subdomain is received. In the present embodiment, the website includes a newly created website (e.g. for which cnames have not yet been created). For example, the request may include a request to make a created website publicly accessible registering in DNS a location of the website on the subdomain. In one embodiment, the determination may be made by determining whether a new request has been placed on a messaging queue. One example of such a message queue is described in U.S. Provisional Patent Application No. 61/324,699, entitled "Methods And Systems For Servicing A Messaging Queue In An On-Demand Service Environment," by Vijayanth Devadhar et al., filed Apr. 15, 2010, the entire contents of which are incorporated herein by reference.

If it is determined that a request to create a website on a subdomain has not been received, the method 200 continues to wait for such a request to be received. Upon receipt of a request to create a website on a subdomain, it is further determined whether the website is a first website on the subdomain. Note decision 204. For example, it may be determined whether any other website has been created on the subdomain. If it is determined that the website is not a first website on the subdomain, the method 200 terminates. To this end, the remaining operations 206-212 of the method 200 for creating a plurality of cnames for a newly created website may optionally only be performed for a first website on the subdomain.

In response to a determination that the website is a first website on the subdomain, parameters for cname creation are determined from the request. Note operation 206. The parameters may be included as a plurality of subsets of parameters. For example, a first subset may be included in a first message of the request and a second subset may be included in a second message of the request. The first subset may be specific to a first location of the website (e.g. a location on the subdomain on which the website is published) and the second subset may be specific to a second location of the website (e.g. a server storing a cached version of the website).

In one embodiment, the parameters may include a domain name pointing to a location of the website, a suffix of the website, an identifier of the subdomain, and an identifier of a previous subdomain. Where the request to create the website is a request to create a new website, such that a previous subdomain for the website does not exist, the identifier of the subdomain may be used as the identifier of the previous subdomain.

In addition, as shown in operation 208, a first cname pointing to a first location on a network is created, based on a first subset of the parameters. The first location may include the first location described above, namely a location on the subdomain on which the website is published. Further, the first subset of the parameters may include the first subset of the parameters described above that are specific to a first location of the website.

In one embodiment, the first cname may be created by inserting the parameters of the first subset of parameters into a predefined cname template. Thus, the format of the first cname may be specific to the template. Additionally, the content of the first cname may be customized using the parameters in the first subset of parameters.

In this way, the first cname may be constructed using the parameters, and therefore may do so without having to figure out whether the cname points to the subdomain on which the website is requested to be created or on another domain storing a cached copy of the website, which server on the subdomain the cname points to, etc. For example, the first cname may be constructed by appending the suffix of the website to the identifier of the subdomain and pointing the result to the parameter indicating the domain name pointing to the first location of the website.

Furthermore, a second cname pointing to a second location on a network is created based on the parameters, as shown in operation 210. The second location may include the second location described above, namely a server storing a cached version of the website. Further, the second subset of the parameters may include the second subset of the parameters described above that are specific to a second location of the website.

In one embodiment, the second cname may be created by inserting the parameters of the second subset of parameters into a predefined cname template. Thus, the format of the second cname may be specific to the template. Additionally, the content of the second cname may be customized using the parameters in the second subset of parameters.

In this way, the second cname may be constructed using the parameters, and therefore may do so without having to figure out whether the second cname points to the subdomain on which the website is requested to be created or on another domain storing a cached copy of the website, which server on the subdomain the cname points to, etc. For example, the second cname may be constructed by appending the suffix of the website to the identifier of the subdomain and pointing the result to the parameter indicating the domain name pointing to the second location of the website.

Still yet, the first cname and the second cname are stored as DNS entries. Note operation 212. To this end, the website may be publicly accessible via the DNS entries. As an option, it may be confirmed that the first cname and the second cname have been stored as DNS entries. This confirmation rimy be provided in a periodic manner, and may include informing a publisher of the website once it has been determined that the first cname and the second cname have been stored as DNS entries (e.g. such that the publisher may use the first cname and the second cname for accessing the website).

Figure 3:
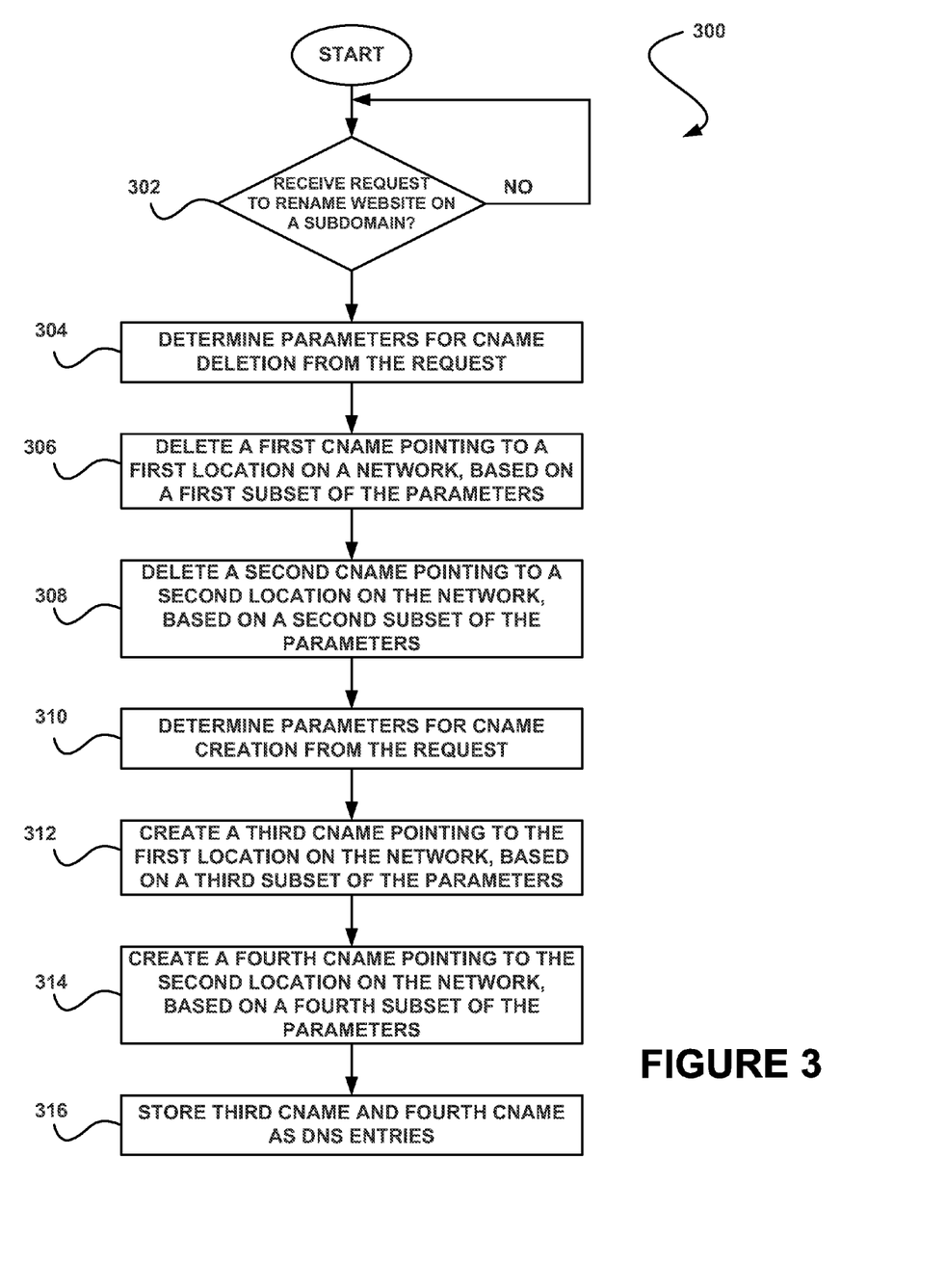
FIG. 3 illustrates a method for creating a plurality of cnames when renaming a website, in accordance with an embodiment.

FIG. 3 illustrates a method 300 for creating a plurality of cnames when renaming a website, in accordance with an embodiment. As an option, the present method 300 may be carried out in the context of the functionality of FIGS. 1-2. Of course, however, the method 300 may be carried out in any desired environment. Again, the aforementioned definitions may apply during the present description.

As shown in decision 302, it is determined whether a request to rename a website on a subdomain has been received. In the present embodiment, the request may include any request to rename a subdomain on which a website has already been created. Accordingly, renaming the website may include creating new cnames for accessing a website for which cnames have previously been created (e.g. according to the method 200 of FIG. 2).

In one embodiment, the determination may be made by determining whether a new request has been placed on a messaging queue, such as the messaging queue described above with respect to FIG. 2. In another embodiment, the determination may be made by determining whether a previous first cname and a previous second cname exist for the subdomain (e.g. in DNS).

If it is determined that a request to rename a website on a subdomain has not been received, the method 200 continues to wait for such a request to be received. However, once it is determined that a request to rename a website on a subdomain has been received (e.g. the previous first cname and the previous second cname exist for the subdomain), parameters for cname deletion are determined from the request. Note operation 304. The parameters may include any parameters capable of being utilized to identify cnames existing as DNS entries which are to be overwritten with newly created cnames associated with the renaming of the website.

In one embodiment, the parameters may include a first subset and a second subset. For example, the first subset may be capable of being utilized to identify a first cname existing as a DNS entry for the website and the second subset may be capable of being utilized to identify a second cname existing as a DNS entry for the website.

In another embodiment, the first subset and the second subset may each be received as a message. Table 3 illustrates one example of the format of a message that may be included in the request for renaming the website for use in deleting existing cnames, where such format is shown as a comma separated string. Again, it should be noted that the message format shown in Table 2 is set forth for illustrative purposes only, and thus should not be construed as limiting in any manner.

TABLE 3

<site suffix>, <subdomain>

As shown, the message may include the suffix of the website and the identifier of the previous subdomain requesting to be renamed. In the context of the format shown in Table 3, the message ".force.com,foo" would be the parameters for deleting the cname "foo.force.com" and the message ".secure.force.com,foo" would be the parameters for deleting the cname "foo.secure.force.com."

As shown in operation 306, a first cname pointing to a first location on a network is deleted, based on a first subset of the parameters. Further, as shown in operation 308, a second cname pointing to a second location on a network is deleted, based on a second subset of the parameters. As noted above, the first subset may be capable of being utilized to identify the first cname existing as a DNS entry for the website and the second subset may be capable of being utilized to identify the second cname existing as a DNS entry for the website, such that the first cname and the second cname may be deleted upon the identification thereof.

Figure 4:
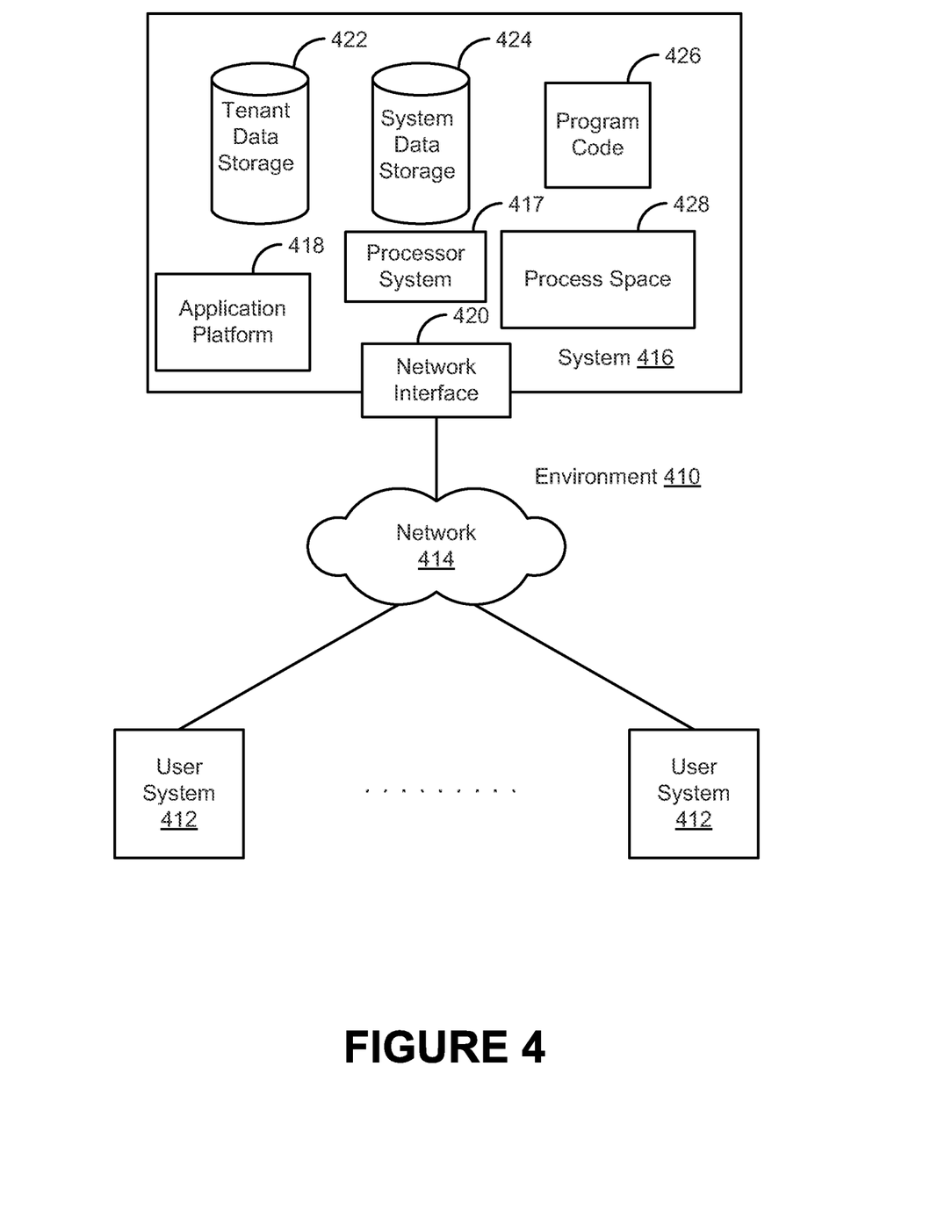
FIG. 4 illustrates a block diagram of an example of an environment wherein an on-demand database service might be used.

Furthermore, parameters for cname creation are determined from the request (operation 310), a third cname pointing to the first location on the network is created based on a third subset of the parameters (operation 312), a fourth cname pointing to the second location on the network is created based on a fourth subset of the parameters (operation 314), and the third cname and the fourth cname are stored as DNS entries (operation 316). It should be noted that operations 310-316 may be carried out in the manner described above with respect to operations 206-212 of FIG. 2, respectively. To this end, when a subdomain is to be renamed (e.g. is it determined that previous cnames exist as DNS entries for the subdomain), the previous cnames may be deleted prior to creating new cnames as DNS entries associated with the subdomain, System Overview FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
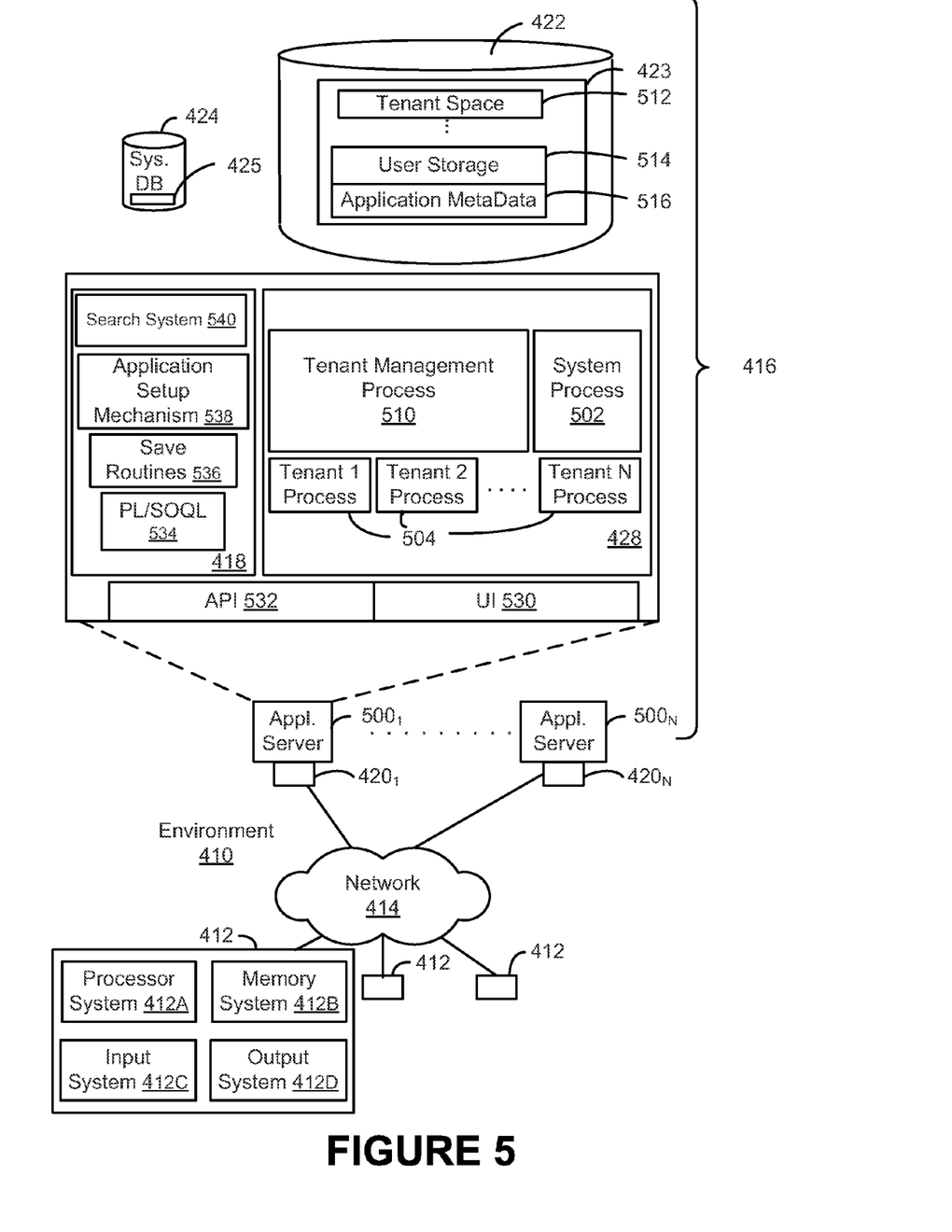
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL, 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackball's, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example, invocations to such applications may be coded using PL/SOQL 534 that provides a programming language style interface extension to API 532, A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server 500$_1$ might be coupled via the network 414 (e.g., the Internet), another application server 500$_{N-1}$ might be coupled via a direct network link, and another application server 500$_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and Observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an NITS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art.

Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code implementg a method for creating a plurality of cnames for a website, the method comprising:
   receiving at a system a request to create a website on a subdomain, the subdomain including a subpart of a larger domain, wherein the request includes a first subset of parameters including a first location of the website, a first suffix of the website, and an identifier of the subdomain, and wherein the request also includes a second subset of parameters including a second location of the website, a second suffix of the website, and the identifier of the subdomain;
   based on the first subset of parameters of the request, appending at the system the first suffix of the website to the identifier of the subdomain to create a first cname, and pointing the first cname to the first location of the website;
   based on the second subset of parameters of the request, appending at the system the second suffix of the website to the identifier of the subdomain to create a second cname, and pointing the second cname to the second location of the website; and
   providing access to the website via the first cname and the second cname.

2. The computer program product of claim 1, wherein the website includes a first website to be created on the subdomain.

3. The computer program product of claim 1, wherein the subdomain is of a multi-tenant on-demand database system.

4. The computer program product of claim 1, wherein the first location is on the subdomain.

5. The computer program product of claim 1, wherein the second location is on a domain separate from the subdomain.

6. The computer program product of claim 1, wherein the first location includes a server on which a publisher of the website stores the website.

7. The computer program product of claim 1, wherein the second location includes a server on which a service caches a copy of the website.

8. The computer program product of claim 1, wherein the first subset of the parameters further includes an identifier of a previous subdomain.

9. The computer program product of claim 1, wherein the second subset of the parameters further includes an identifier of a previous subdomain.

10. The computer program product of claim 1, further comprising determining whether a previous first cname and a previous second cname exist for the sub domain.

11. The computer program product of claim 10, further comprising deleting the previous first cname and the previous second cname prior to creating the first cname and the second cname, in response to a determination that the previous first cname and the previous second cname exist for the subdomain.

12. The computer program product of claim 1, wherein providing access to the website via the first cname and the second cname includes storing the first cname and the second cname as domain name service (DNS) entries.

13. The computer program product of claim 1, wherein secure network traffic is provided access to the website via the first cname.

14. The computer program product of claim 1, wherein unsecure network traffic is provided access to the website via the second cname.

15. The computer program product of claim 1, wherein the request includes a string having a plurality of parameters separated by one or more commas.

16. A method, comprising:
   receiving at a system a request to create a website on a subdomain, the subdomain including a subpart of a larger domain, wherein the request includes a first subset of parameters including a first location of the website, a first suffix of the website, and an identifier of the subdomain, and wherein the request also includes a second subset of parameters including a second location of the website, a second suffix of the website, and the identifier of the subdomain;
   based on the first subset of parameters of the request, appending at the system the first suffix of the website to the identifier of the subdomain to create a first cname, and pointing the first cname to the first location of the website;
   based on the second subset of parameters of the request, appending at the system the second suffix of the website to the identifier of the subdomain to create a second cname, and pointing the second cname to the second location of the website; and
   providing access to the website via the first cname and the second cname, utilizing a processor.

17. An apparatus, comprising:
   a processor for:
      receiving at a system a request to create a website on a subdomain, the subdomain including a subpart of a larger domain, wherein the request includes a first subset of parameters including a first location of the website, a first suffix of the website, and an identifier of the subdomain, and wherein the request also includes a second subset of parameters including a second location of the website, a second suffix of the website, and the identifier of the subdomain;
      based on the first subset of parameters of the request, ag t the system the first suffix of the website to the identifier of the subdomain to create a first cname, and pointing the first cname to the first location of the website;
      based on the second subset of parameters of the request, ag t the system the second suffix of the website to the identifier of the subdomain to create a second cname, and pointing the second cname to the second location of the website; and
      providing access to the website via the first cname and the second cname.

18. The apparatus if claim 17, wherein the processor is in a multi-tenant on-demand database system.

19. A method for transmitting code using a non-transitory computer readable medium, comprising:
   transmitting code to receive at a system a request to create a website on a subdomain, the subdomain including a subpart of a larger domain, wherein the request includes a first subset of parameters including a first location of the website, a first suffix of the website, and an identifier of the subdomain, and wherein the request also includes a second subset of parameters including a second location of the website, a second suffix of the website, and the identifier of the subdomain;
   transmitting code to append at the system the first suffix of the website to the identifier of the subdomain to create a first cname, and pointing the first cname to the first location of the website, based on the first subset of parameters of the request;

transmitting code to append at the system the second suffix of the website to the identifier of the subdomain to create a second cname, and pointing the second cname to the second location of the website, based on the second subset of parameters of the request; and transmitting code to provide access to the website via the first cname and the second cname, utilizing a processor.

20. The method of claim 19, wherein the method is performed by a multi-tenant on-demand database system.

* * * * *

UNITED STATES PATENT AND TRADEMARK OFFICE
CERTIFICATE OF CORRECTION

| | | |
|---|---|---|
| PATENT NO. | : 9,031,996 B2 | Page 1 of 1 |
| APPLICATION NO. | : 12/982708 | |
| DATED | : May 12, 2015 | |
| INVENTOR(S) | : Jayesh Sureshchandra et al. | |

It is certified that error appears in the above-identified patent and that said Letters Patent is hereby corrected as shown below:

On the Title Page:
item (73) Assignee; please replace "salesforce.com" with --salesforce.com, inc.--.

In the Claims:
column 15, claim 1, line 8; please replace "implementg" with --implementing--;
column 15, claim 10, line 54; please replace "sub domain" with --subdomain--;
column 16, claim 17, lines 41-42; please replace "ag t" with --appending at--;
column 16, claim 17, line 47; please replace "ag t" with --appending at--.

Signed and Sealed this
Eighteenth Day of August, 2015

Michelle K. Lee
*Director of the United States Patent and Trademark Office*